(12) United States Patent
Wang (10) Patent No.: US 9,550,518 B2
(45) Date of Patent: Jan. 24, 2017

(54) ELECTRIC POWER STEERING ASSEMBLY

(71) Applicant: TRW Automotive U.S. LLC, Livonia, MI (US)

(72) Inventor: James Wang, Bloomfield Hills, MI (US)

(73) Assignee: TRW AUTOMOTIVE U.S. LLC, Livonia, MI (US)

(*) Notice: Subject to any disclaimer, the term of this patent is extended or adjusted under 35 U.S.C. 154(b) by 0 days.

(21) Appl. No.: 14/145,123

(22) Filed: Dec. 31, 2013

(65) Prior Publication Data
US 2015/0183455 A1    Jul. 2, 2015

(51) Int. Cl.
| | |
|---|---|
| *B62D 5/04* | (2006.01) |
| *F16C 19/54* | (2006.01) |
| *F16C 23/08* | (2006.01) |
| *F16C 25/08* | (2006.01) |
| *F16H 25/24* | (2006.01) |

(52) U.S. Cl.
CPC .......... *B62D 5/0448* (2013.01); *B62D 5/0424* (2013.01); *F16C 19/547* (2013.01); *F16C 23/08* (2013.01); *F16C 25/083* (2013.01); *F16H 25/24* (2013.01); *Y10T 74/18664* (2015.01)

(58) Field of Classification Search
CPC .................................................. B62D 5/0421
See application file for complete search history.

(56) References Cited

U.S. PATENT DOCUMENTS

| | | | |
|---|---|---|---|
| 6,378,646 B1 | 4/2002 | Bugosh | |
| 6,499,369 B1 * | 12/2002 | Piotrowski | F16H 25/2209 384/517 |
| 7,055,646 B2 | 6/2006 | Bugosh | |
| 8,931,362 B2 * | 1/2015 | Speidel | B62D 5/0448 74/388 PS |
| 2006/0171624 A1 * | 8/2006 | Niebling | B60B 27/00 384/544 |
| 2011/0167940 A1 * | 7/2011 | Shavrnoch | B62D 5/0448 74/89.36 |

FOREIGN PATENT DOCUMENTS

KR        EP 1876084 A1 *  1/2008  ........... B62D 5/0409

* cited by examiner

*Primary Examiner* — Joseph Rocca
*Assistant Examiner* — Felicia L Brittman
(74) *Attorney, Agent, or Firm* — MacMillan, Sobanski & Todd, LLC (57) ABSTRACT

A rack drive assembly adapted for use in a vehicle electric power steering assembly includes a ball nut assembly operatively connected to a screw portion of a rack portion of a steering member of the power steering assembly for effecting axial movement of the steering member upon rotation of a vehicle steering wheel. According to one embodiment, the ball nut assembly includes a first bearing assembly disposed in the rack housing and carried by a ball nut, the first bearing assembly disposed on a first end of the ball nut adjacent a first side of the pulley; and a second bearing assembly disposed in the rack housing and carried by the ball nut, the second bearing assembly disposed on an opposite second end of the ball nut adjacent a second side of the pulley.

27 Claims, 4 Drawing Sheets

ELECTRIC POWER STEERING ASSEMBLY

BACKGROUND OF THE INVENTION

This invention relates in general to vehicle electric power steering assemblies and in particular to an improved rack drive assembly adapted for use in such a vehicle electric power steering assembly.

One known electric power steering assembly for turning steerable wheels of a vehicle includes a ball nut for transmitting force between an axially movable rack member and an electric motor. Upon actuation of the electric motor of the power steering assembly, the ball nut is driven to rotate relative to the rack member. The rotational force of the ball nut is transmitted to the rack member by balls to drive the rack member axially. The axial movement of the rack member by the balls effects turning movement of the steerable wheels.

The electric motor in the above-described electric power steering assembly can be coupled to drive the ball nut in various known methods. One such method includes a belt drive assembly wherein an output shaft of the electric motor is connected via a belt to a pulley assembly. The pulley assembly typically includes a pulley which is operatively fixed to the ball nut so that the ball nut rotates with the pulley when the electric motor is actuated. This type of electric power steering assembly has advantages over other known electric power steering assemblies. However, in this type of power steering assembly during operation there can be a misalignment of the associated rack member of the power steering assembly. Thus, it would be desirable to provide an improved structure for support of the rack member which reduces or minimizes such misalignment in the electric power steering assembly and yet is relatively simple and inexpensive.

SUMMARY OF THE INVENTION

This invention relates to an improved structure for a rack drive assembly adapted for use in a vehicle electric power steering assembly. According to one embodiment, the rack drive assembly may comprise, individually and/or in combination, one or more of the following features: a steering member disposed in a rack housing and including a rack portion operatively connected to a vehicle steering wheel and a screw portion; a ball nut assembly operatively connected to the screw portion of the rack portion of the steering member for effecting axial movement of the steering member upon rotation of a vehicle steering wheel, the ball nut assembly including a ball nut having an outer surface; an electric motor operatively connected to the ball nut by a pulley assembly, the pulley assembly including a pulley configured to be carried by the outer surface of the ball nut; a first bearing assembly disposed in the rack housing and carried by the outer surface of the ball nut for rotatably supporting the ball nut assembly relative to the steering member, the first bearing assembly disposed on a first end of the ball nut adjacent a first side of the pulley; and a second bearing assembly disposed in the rack housing and carried by the outer surface of the ball nut for rotatably supporting the ball nut assembly relative to the steering member, the second bearing assembly disposed on an opposite second end of the ball nut adjacent a second side of the pulley.

According to this embodiment, at least one spring-like member may be disposed between an outer race of at least one of the first and second bearing assemblies and an adjacent inner surface of the rack housing.

According to this embodiment, a generally rigid member may be disposed between the at least one spring-like member and the adjacent inner surface of the rack housing.

According to this embodiment, a first spring-like member may be disposed between an outer race of the first bearing assembly and an adjacent inner surface of the rack housing, and a second spring-like member may be disposed between an outer race of the second bearing assembly and an adjacent inner surface of the rack housing.

According to this embodiment, a generally rigid first member may be disposed between the first spring-like member and the adjacent inner surface of the rack housing, and a generally rigid second member may be disposed between the second spring-like member and the adjacent inner surface of the rack housing.

According to this embodiment, the first and second bearing assemblies may each include an outer race, and wherein at least one of the outer races is spaced apart from an adjacent inner surface of the rack housing by a clearance distance.

According to this embodiment, the first bearing assembly may include an outer race, the outer race of the first bearing assembly being spaced apart from an adjacent inner surface of the rack housing by a first clearance distance, and the second bearing assembly may include an outer race, the outer race of the second bearing assembly being spaced apart from an adjacent inner surface of the rack housing by a second clearance distance, wherein the second clearance is different from the first clearance distance.

According to this embodiment, the first bearing assembly may includes an inner race which is configured to be carried by a first stepped portion of the outer surface of the ball nut, and the second bearing assembly may include an inner race which is configured to be carried by a second stepped portion of the outer surface of the ball nut.

According to this embodiment, the first and second bearing assemblies may have bearing contact lines which intersect generally at or near an axis of the steering member.

According to another embodiment, the rack drive assembly may comprise, individually and/or in combination, one or more of the following features: a steering member disposed in a rack housing and including a rack portion operatively connected to a vehicle steering wheel and a screw portion; a ball nut assembly operatively connected to the screw portion of the rack portion of the steering member for effecting axial movement of the steering member upon rotation of a vehicle steering wheel, the ball nut assembly including a ball nut having an outer surface; and an electric motor operatively connected to the ball nut by a pulley assembly, the pulley assembly including a pulley configured to be carried by the outer surface of the ball nut; wherein the ball nut is rotatably supported within the rack housing by a first bearing assembly and a second bearing assembly, the first bearing assembly disposed within the rack housing about the outer surface of the ball nut at a first end thereof adjacent a first end of the pulley and the second bearing assembly disposed within the rack housing about the outer surface of the ball nut at an opposite second end thereof adjacent a second end of the pulley.

According to this embodiment, at least one spring-like member may be disposed between an outer race of at least one of the first and second bearing assemblies and an adjacent inner surface of the rack housing.

According to this embodiment, a generally rigid member may be disposed between the at least one spring-like member and the adjacent inner surface of the rack housing.

According to this embodiment, a first spring-like member may be disposed between an outer race of the first bearing assembly and an adjacent inner surface of the rack housing, and a second spring-like member may be disposed between an outer race of the second bearing assembly and an adjacent inner surface of the rack housing.

According to this embodiment, a generally rigid first member may be disposed between the first spring-like member and the adjacent inner surface of the rack housing, and a generally rigid second member may be disposed between the second spring-like member and the adjacent inner surface of the rack housing.

According to this embodiment, the first and second bearing assemblies may each include an outer race, and wherein at least one of the outer races is spaced apart from an adjacent inner surface of the rack housing by a clearance distance.

According to this embodiment, the first bearing assembly includes an outer race, the outer race of the first bearing assembly being spaced apart from an adjacent inner surface of the rack housing by a first clearance distance, and the second bearing assembly includes an outer race, the outer race of the second bearing assembly being spaced apart from an adjacent inner surface of the rack housing by a second clearance distance, and wherein the second clearance is different from the first clearance distance.

According to this embodiment, the first bearing assembly includes an inner race which is configured to be carried by a first stepped portion of the outer surface of the ball nut, and the second bearing assembly includes an inner race which is configured to be carried by a second stepped portion of the outer surface of the ball nut.

According to this embodiment, the first and second bearing assemblies may have bearing contact lines which intersect generally at or near an axis of the steering member.

According to yet another embodiment, a ball nut assembly adapted for use in a rack drive assembly of a vehicle electric power steering assembly, the rack drive assembly including a steering member disposed in a rack housing and having a rack portion operatively connected to a vehicle steering wheel and a screw portion, may comprise, individually and/or in combination, one or more of the following features: a ball nut configured to be operatively connected to the screw portion of the rack portion of the steering member for effecting axial movement of the steering member upon rotation of a vehicle steering wheel; a first bearing assembly disposed in the rack housing and carried by the ball nut for rotatably supporting the ball nut assembly relative to the steering member, the first bearing assembly disposed on a first end of the ball nut adjacent a first side of the pulley; and a second bearing assembly disposed in the rack housing and carried by the ball nut for rotatably supporting the ball nut assembly relative to the steering member, the second bearing assembly disposed on an opposite second end of the ball nut adjacent a second side of the pulley.

According to this embodiment, at least one spring-like member may be disposed between an outer race of at least one of the first and second bearing assemblies and an adjacent inner surface of the rack housing.

According to this embodiment, a generally rigid member may be disposed between the at least one spring-like member and the adjacent inner surface of the rack housing.

According to this embodiment, a first spring-like member may be disposed between an outer race of the first bearing assembly and an adjacent inner surface of the rack housing, and a second spring-like member may be disposed between an outer race of the second bearing assembly and an adjacent inner surface of the rack housing.

According to this embodiment, a generally rigid first member may be disposed between the first spring-like member and the adjacent inner surface of the rack housing, and a generally rigid second member may be disposed between the second spring-like member and the adjacent inner surface of the rack housing.

According to this embodiment, the first bearing assembly includes an outer race, the outer race of the first bearing assembly being spaced apart from an adjacent inner surface of the rack housing by a first clearance distance, and the second bearing assembly includes an outer race, the outer race of the second bearing assembly being spaced apart from an adjacent inner surface of the rack housing by a second clearance distance, wherein the second clearance is different from the first clearance distance.

According to this embodiment, the first bearing assembly includes an inner race which is configured to be carried by a first stepped portion of the outer surface of the ball nut, and the second bearing assembly includes an inner race which is configured to be carried by a second stepped portion of the outer surface of the ball nut.

According to this embodiment, the first and second bearing assemblies may have bearing contact lines which intersect generally at or near an axis of the steering member.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
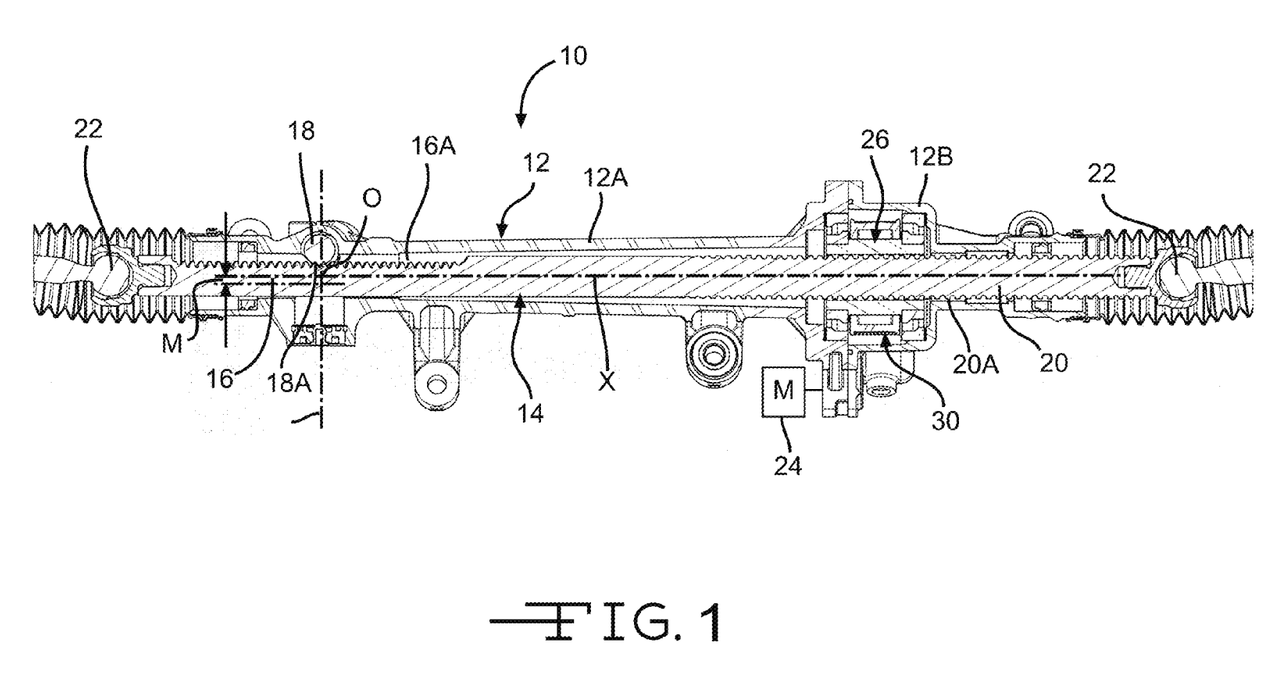
FIG. 1 is a sectional view of a portion of an embodiment of a vehicle electric power steering assembly.

Referring now to FIG. 1, there is illustrated ant embodiment of a vehicle electric power steering assembly, indicated generally at 10, constructed in accordance with the present invention. The illustrated vehicle electric power steering assembly 10 is a vehicle electric belt driven rack drive steering assembly and is associated with the front driven wheels (not shown) of the vehicle. The general structure and operation of the electric power steering assembly 10 is conventional in the art. Thus, only those portions of the electric power steering assembly 10 which are necessary for a full understanding of this invention will be explained and illustrated in detail. Also, although this invention will be described and illustrated in connection with the particular electric power steering assembly 10 disclosed herein, it will be appreciated that this invention may be used in connection with other electric power steering assemblies. For example, the invention may be used in connection with other electric power steering assemblies if so desired, such as for example, as shown in U.S. Pat. No. 7,055,646 to Bugosh, U.S. Pat. No. 6,644,432 to Yost et al., and U.S. Pat. No. 6,378,646 to Bugosh, the disclosure of each of these patents incorporated by reference in entirety herein.

The illustrated electric power steering assembly 10 includes a rack housing, indicated generally at 12, and a rack or steering member, indicated generally at 14, disposed therein. In the illustrated embodiment, the rack housing 12 includes a first or "inner" housing portion 12A and a second or "outer" housing portion 12B connected together by suitable means, such as for example, threaded fasteners (not shown). The steering member 14 is linearly (or axially) movable along a rack axis or centerline X. The steering member 14 includes a rack portion 16 which is provided with a series of rack teeth 16A which meshingly engage gear teeth 18A provided on a pinion 18 which is operatively connected to a steering wheel (not shown) of the vehicle.

In the illustrated embodiment, the steering member 14 further includes a screw portion 20 having an external thread convolution 20A. The steering member 14 is connected with steerable wheels (not shown) of the vehicle through tie rods 22 (partially shown) located at the distal ends of the steering member 14. Linear movement of the steering member 22 along the rack axis X results in steering movement of the steerable wheels in a known manner.

The illustrated electric power steering assembly 10 further includes an electric motor (schematically illustrated by reference number 24), which, as will be discussed below in detail, is drivably connected to a ball nut assembly, indicated generally at 26, for effecting axial movement of the steering member 14 upon rotation of the vehicle steering wheel. In the event of the inability of the electric motor 26 to effect axial movement of the steering member 14, the mechanical connection between the gear teeth 18A on the pinion 18 and the rack teeth 16A on the rack portion 16 of the steering member 14 permits manual steering of the associated vehicle.

Figure 2:
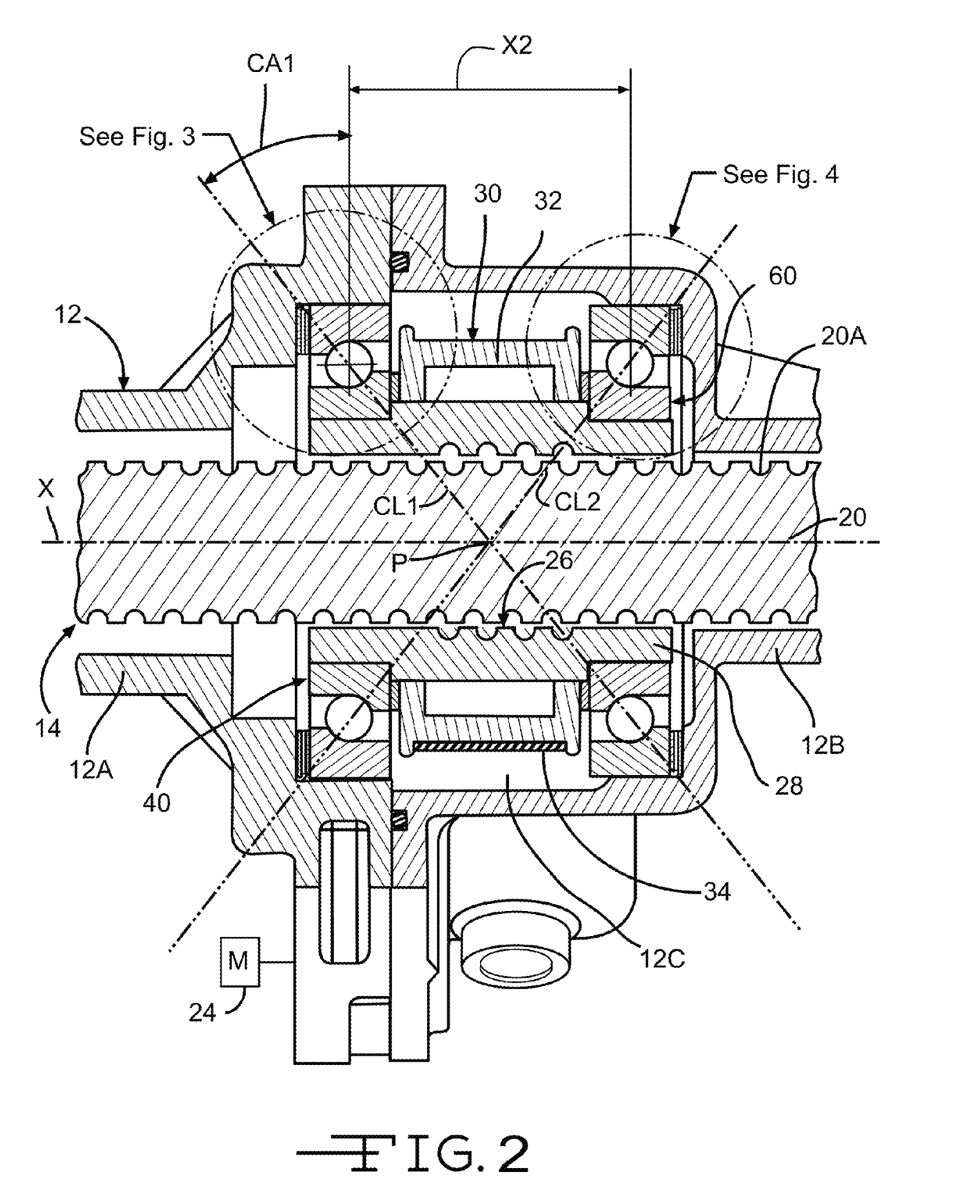
FIG. 2 is an enlarged view of a portion of the vehicle electric power steering assembly illustrated in FIG. 1.

Turning now to FIG. 2, the construction of the ball nut assembly 26 is best shown and will be discussed in detail. As shown in the illustrated embodiment, the ball nut assembly 26 is located in an internal chamber 12C of the rack housing 12, which is defined by an end portion of the first housing portion 12A and an end portion of the second housing portion 12B where the two housing portions 12A and 12B are connected together, and encircles the screw portion 20 of the steering member 14. The ball nut assembly 26 further includes a ball nut 28 which is suitably secured to a pulley assembly, indicated generally at 30, for rotation therewith. In the illustrated embodiment, the ball nut 28 is configured to be secured to a pulley 32 of the pulley assembly 30 by a press fit. In addition, in the illustrated embodiment the pulley assembly 30 is configured to connected to the electric motor 24 by suitable means, such as for example by a timing belt 34. Alternatively, the ball nut 28 may be operatively secured to the pulley 32 and/or the pulley assembly 30 may be operatively connected to the motor 24 by other suitable means, if so desired.

The illustrated ball nut assembly 26 of the electric power steering assembly 10 further includes a pair of bearing assemblies, indicated generally at 40 and 60. In the illustrated embodiment, the bearing assemblies 40 and 60 are preferably identical to one another and are preferably angular contact type of ball bearings so that they can accommodate combined loads, i.e., simultaneously acting radial and axial loads. Alternatively, the bearing assemblies 40 and 60 do not have to be identical to each other and/or one or both of the bearing assemblies 40 and 60 may be of a different type than that which is illustrated and described, if so desired.

Figure 3:
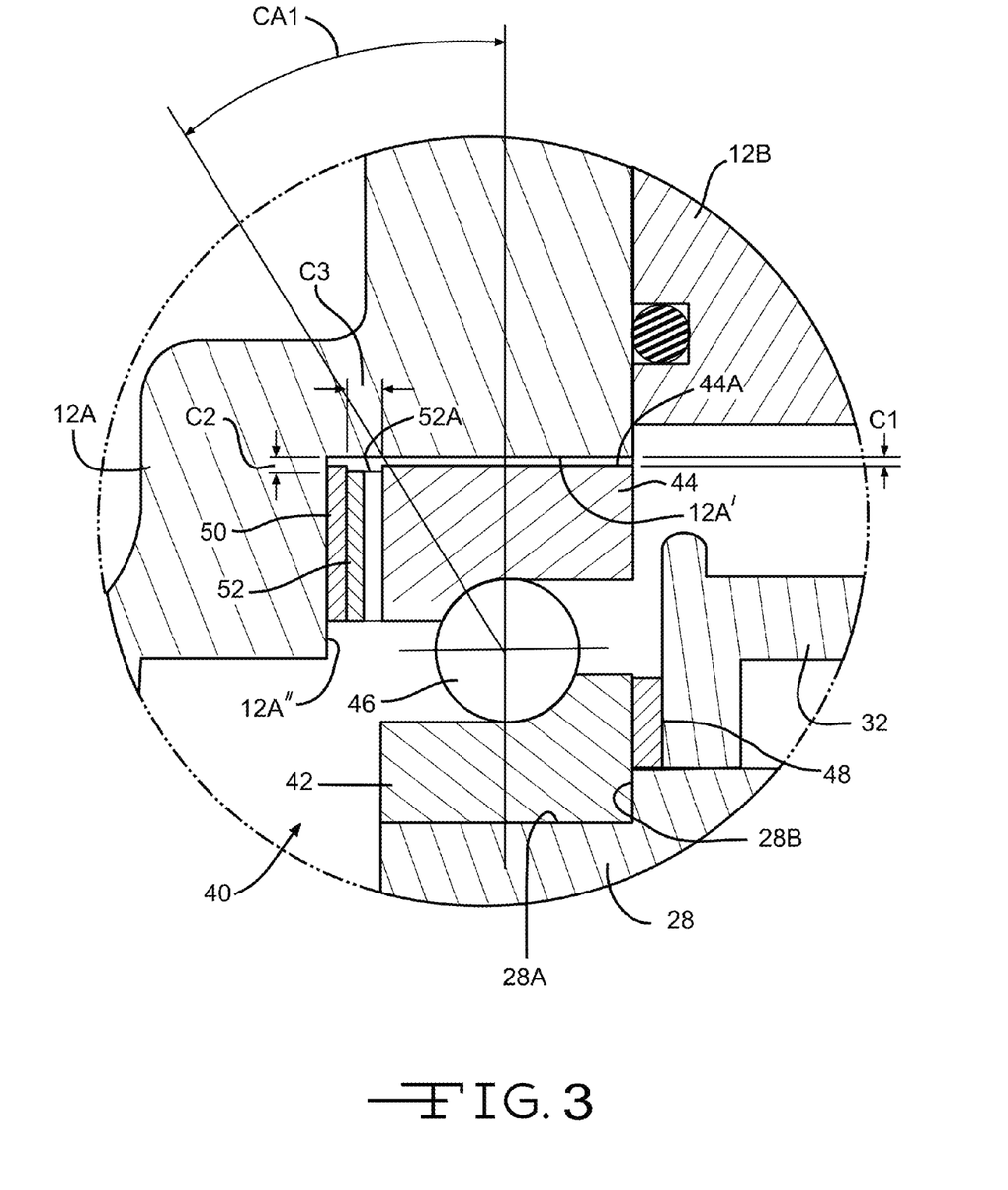
FIG. 3 is an enlarged view of a portion of the vehicle electric power steering assembly illustrated in FIGS. 1 and 2.

Referring now to FIG. 3, in the illustrated embodiment the bearing assembly 40 is a single row ball type of angular contact bearing assembly and includes an inner race 42, an outer race 44 and balls 46 disposed therebetween. In the illustrated embodiment, the bearing assembly 40 preferably defines a contact angle CA1 between 40 to 45 degrees.

In the illustrated embodiment, the inner race 42 is disposed in a stepped down portion 28A of the ball nut 28 having a radially extending shoulder 28B. Alternatively, the inner race 42 does not have to be disposed in a stepped down portion of the ball nut 28.

Also, in the illustrated embodiment, an optional member 48, such as for example a washer, may be provided on the ball nut 28 interposed between the inner race 42 and the pulley 32. The washer 48 may be a rigid or flexible washer formed from a suitable material, such as for example steel. In addition, the washer 48 may have a damping or isolating material disposed or coated thereon, such as for example rubber (not shown).

In the illustrated embodiment, the outer race 44 is disposed in a "pocket" of the housing portion 12A defined by a first or inner axially extending surface 12A' and a second or inner radially extending surface 12A". As shown therein, the outer race 44 preferably includes an outer "diameter" surface 44A which is spaced apart from the adjacent first surface 12A' of the housing portion 12A by a distance or clearance C1 which in use allows the bearing assembly 40 to tilt or move angularly, preferably about 0.1 degrees to allow for "misalignment" of the steering member 14. As used herein, the term "misalignment" generally refers to a concept when a shaft (i.e., the steering member 14 in this case) is supported at multiple points along its axis and as a result thereof, can be misaligned along its axis. In the present application, the ball nut assembly 26 supported by the bearing assemblies 40 and 60 defines the steering member axis or centerline X. By design, and if manufacturing tolerances are not considered, the steering member center line will go through a rack center point O defined by the yoke (not shown) and the pinion 18 that the rack center has to go through. Due to the manufacturing tolerances however, the steering member center line X will not go exactly through the center point O without some sufficient clearances in the constrains (i.e., by the supports provided by ball nut assembly 26, the pinion 18 and the yoke) or slightly elastic deformation of such components and/or the associated components of the steering assembly 10. The offset (i.e., distance) from point O to the steering member axis X is defined as misalignment and is shown in FIG. 1 by reference character M.

In the illustrated embodiment, the clearance C1 may be in the range from about 0.03 mm to about 0.10 mm (which corresponds to a diametrical clearance between the outer surface 44A and the inner surface 12A' in the range from about 0.06 mm to about 0.20 mm). Alternatively, the clearance C1 may be other than illustrated and described if so desired. Also, in order to allow for the slight tilt by the bearing assembly 40 to correct for misalignment, the outer race 44 of the bearing assembly 40 could be configured to have a slight crown or rounded outer surface 44A (not shown).

In the illustrated embodiment, the ball nut assembly 26 preferably further includes a first member 50 adjacent the second surface 12A" of the housing portion 12A and a second member 52 disposed between the first member 50 and the outer race 44. The first member 50 may be a generally rigid or non-flexible member 50, such as for example a flat washer, formed from a suitable material, such as for example steel. In addition, the first member 50 may have a damping or isolating material disposed or coated thereon, such as for example rubber (not shown). Preferably, the first member 50 is provided between the first housing portion 12A and the second member 52 to prevent wear or fatigue of the first housing portion 12A, which may be formed for aluminum, from second member 52, which may be formed from steel.

In the illustrated embodiment, the second member 52 may be a suitable spring like member, such as for example, a spring or wave washer formed from a suitable material, such as for example spring steel As shown in FIG. 3, the second member 52 is disposed in the pocket of the housing portion 12A with a "radial" clearance C2 defined between an outer surface 52A thereof and the second surface 12A' of the housing portion 12A, and with an "axial" clearance C3 defined between the first member 50 and the outer race 44.

In the illustrated embodiment, the clearance C2 is preferably provided to allow for the wave washer 52 to expand when compressed and is determined depending upon the particular design characteristics of the selected wave washer 52 and related components of the ball nut assembly 26 and/or the electric power steering assembly 10. The clearance C2 may be in the range from about 0.2 mm to about 0.10 mm (which corresponds to a diametrical clearance between the outer surface 52A and the inner surface 12A' in the range from about 0.40 mm to about 0.20 mm). Alternatively, the clearance C2 may be other than illustrated and described if so desired.

In the illustrated embodiment, the clearance C3 is related to the particular rigidity and flexibility of the selected wave washer 52 and depends upon the particular design characteristics of the selected wave washer 52 and related components of the ball nut assembly 26 and/or the electric power steering assembly 10. The clearance C3 may be in the range from about 0.8 mm to about 2.0 mm. Alternatively, the clearance C3 may be other than illustrated and described if so desired. Alternatively, the particular construction of one or more of the bearing assembly 40 and its associated components, including one or more of the members 48, 50 and 52, may be other than illustrated and described, if so desired. For example, one or more of the members 48, 50 and 52 may not be needed leaving only the bearing assembly 40 in the pocket between the housing portion 12A and the pulley 32. However, it is preferable that the bearing assembly 40 and at least the member 52 be disposed in the pocket between the housing portion 12A and the pulley 32.

Figure 4:
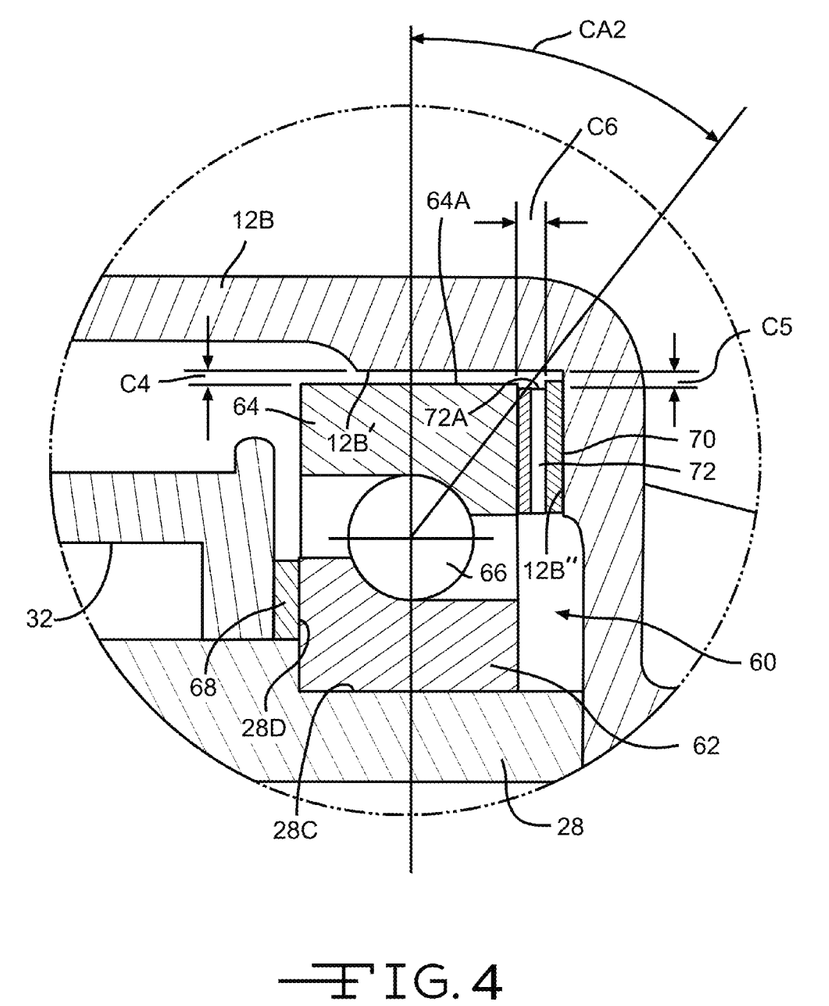
FIG. 4 is an enlarged view of a portion of a the vehicle electric power steering assembly illustrated in FIGS. 1 and 2.

Turning now to FIG. 4, in the illustrated embodiment the bearing assembly 60 is a single row ball type of angular contact bearing assembly and includes an inner race 62, an outer race 64 and balls 66 disposed therebetween. In the illustrated embodiment, the bearing assembly 60 preferably defines a contact angle CA2 between 40 to 45 degrees. Also, as shown in FIG. 2, in the illustrated embodiment the contact angles CA1 and CA2 of the bearings 40 and 60, respectively, are preferably close to matching a distance X2 between the center axes of the bearings 40 and 60. As a result of this, such an arrangement may result in the assembly being more misalignment tolerant by having the center axes closer to one another such that the two bearings 40 and 60 cooperate to act similar to a single spherical bearing arrangement within a relatively small rotational range, i.e., about 0.1 degree for example. In addition, as shown in FIG. 2, preferably the contact lines CL1 and CL2 of the bearings 40 and 60, respectively, go through the same point P of the rack axis X or near it Alternatively, one or both of the contact angles CA1 and CA2 and/or the contact lines CL1 and CL2 may be other than illustrated and described, if so desired.

In the illustrated embodiment, the inner race 62 is disposed in a stepped down portion 28C of the ball nut 28 having a radially extending shoulder 28D. Alternatively, the inner race 62 does not have to be disposed in a stepped down portion of the ball nut 28.

Also, in the illustrated embodiment, an optional member 68, such as for example a washer, may be provided on the ball nut 28 interposed between the inner race 62 and the pulley 32. The washer 68 may be a rigid or flexible washer formed from a suitable material, such as for example steel. In addition, the washer 68 may have a damping or isolating material disposed or coated thereon, such as for example rubber (not shown).

In the illustrated embodiment, the outer race 64 is disposed in a "pocket" of the housing portion 12B defined by a first or inner axially extending surface 12B' and a second or inner radially extending surface 12B". As shown therein, the outer race 64 preferably includes an outer "diameter" surface 64A which is spaced apart from the adjacent first surface 12B' of the housing portion 12B by a distance or clearance C4 which in use allows the bearing assembly 60 to tilt or move angularly to allow for misalignment of the steering member 14. Thus, as can be understood, in the illustrated embodiment the pocket in the housing section 12B for the outer race 64 is different and preferably greater than the pocket in the housing section 12A for the outer race 44. Alternatively, the pockets in the housing sections 12A and 12B for the outer races 44 and 64, respectively, can be the same if so desired. Also, alternatively, only one of the two bearing assemblies 40 and 60 may be provided with a clearance between its associated outer diameter surface 64A and the associated adjacent first surface of the housing portion to allow such bearing assembly to tilt or move angularly to allow for misalignment of the steering member 14.

In the illustrated embodiment, the clearance C4 may be in the range from about 0.1 mm to about 0.5 mm (which corresponds to a diametrical clearance between the outer surface 64A and the inner surface 12B' in the range from about 0.2 mm to about 1.0 mm). Alternatively, the clearance C4 may be other than illustrated and described if so desired. Also, in order to allow for the slight tilt by the bearing assembly 60 to correct for misalignment, the outer race 64 of the bearing assembly 60 could be configured to have a slight crown or rounded outer surface 64A (not shown).

In the illustrated embodiment, the ball nut assembly 26 preferably further includes a first member 70 adjacent the second surface 12B" of the housing portion 12B and a second member 72 disposed between the first member 70 and the outer race 64. The first member 70 may be a generally rigid or non-flexible member 70, such as for example a flat washer formed from a suitable material, such as for example steel. In addition, the first member 70 may have a damping or isolating material disposed or coated thereon, such as for example rubber (not shown). Preferably, the first member 70 is provided between the first housing portion 12B and the second member 72 to prevent wear or fatigue of the first housing portion 12B, which may be formed for aluminum, from second member 72, which may be formed from steel.

In the illustrated embodiment, the second member 72 may be a suitable spring-like member, such as for example a spring or wave washer formed from a suitable material, such as for example spring steel. As shown in FIG. 4, the second member 72 is disposed in the pocket of the housing portion 12B with a "radial" clearance C5 defined between an outer surface 72A thereof and the second surface 12B' of the housing portion 12B, and with an "axial" clearance C6 defined between the first member 70 and the outer race 64.

In the illustrated embodiment, the clearance C5 is preferably provided to allow for the wave washer 72 to expand when compressed and is determined depending upon the particular design characteristics of the selected wave washer 72 and related components of the ball nut assembly 26 and/or the electric power steering assembly 10. The clearance C5 may be in the range from about 0.2 mm to about 0.10 mm (which corresponds to a diametrical clearance between the outer surface 72A and the inner surface 12B' in the range from about 0.40 mm to about 0.20 mm). Alternatively, the clearance C5 may be other than illustrated and described if so desired.

In the illustrated embodiment, the clearance C6 is related to the particular rigidity and flexibility of the selected wave washer 72 and depends upon the particular design characteristics of the selected wave washer 72 and related components of the ball nut assembly 26 and/or the electric power steering assembly 10. The clearance C6 may be in the range from about 0.8 mm to about 2.0 mm. Alternatively, the clearance C6 may be other than illustrated and described if so desired. Alternatively, the particular construction of one or more of the bearing assembly 60 and its associated components, including one or more of the members 68, 70 and 72, may be other than illustrated and described, if so desired. For example, one or more of the members 68, 70 and 72 may not be needed leaving only the bearing assembly 60 in the pocket between the housing portion 12B and the pulley 32. However, it is preferable that the bearing assembly 60 and at least the member 72 be disposed in the pocket between the housing portion 12B and the pulley 32.

Potential advantages of the electric power steering assembly 10 of the present invention is that the use of the two bearings 40 and 60 on opposite sides of the pulley 32 to support the ball nut 28 should be effective to reduce or prevent potential misalignment of the associated components of the steering assembly relative to the rack axis X by providing a self-aligning feature of the associated components of the steering assembly 10. This is achieved by one bearing pocket being preferably larger than the other, that is C1>C4 or C4>C1. This also uses the two bearings. However, one clearance does not have to be larger than the other one for providing the "tilt". However, it is preferred that one clearance be larger for one bearing to take up the radial load. However, if the bearings outer race is pressed enough by the wave washers (which are at least preferably present) after assembly, the friction may be able to take the total radial load, thus the clearances C1>C4 or C1<C4 may not be necessary. In addition, the use of the wave washers 52 and 72, or at least one of them, should be effective to allow the outer race of the associated bearing assembly to tilt and thus reduce rack axis misalignment. This also requires clearances C1 and C4 but does not require one clearance to be greater than the other one.

Also, the use and arrangement of the two angular contact bearings 40 and 60 as shown in the illustrated embodiment should be effective such that the loading force lines of the four balls in any cross section through the rack center line X intersect at one point P on the rack center line X (as shown in FIG. 2), or each two of the force lines intersect at a point near the rack center line (not shown). It is believed that as long as the two intersections are at least close to the rack center line, the potential benefit of the two centers become one can be achieved. This can be accomplished by choosing one or more of the size of the bearings, their contact angle, and the space between the two bearings.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A rack drive assembly adapted for use in a vehicle electric power steering assembly comprising:
   a steering member disposed in a rack housing and including a rack portion operatively connected to a vehicle steering wheel and a screw portion;
   a ball nut assembly operatively connected to the screw portion of the rack portion of the steering member for effecting axial movement of the steering member upon rotation of a vehicle steering wheel, the ball nut assembly including a ball nut having an outer surface;
   an electric motor operatively connected to the ball nut by a pulley assembly, the pulley assembly including a pulley configured to be carried by the outer surface of the ball nut;
   a first bearing assembly disposed in the rack housing and carried by the outer surface of the ball nut for rotatably supporting the ball nut assembly relative to the steering member, the first bearing assembly disposed on a first end of the ball nut adjacent a first side of the pulley; and
   a second bearing assembly disposed in the rack housing and carried by the outer surface of the ball nut for rotatably supporting the ball nut assembly relative to the steering member, the second bearing assembly disposed on an opposite second end of the ball nut adjacent a second side of the pulley,
   wherein the first and second bearing assemblies each include an outer race, wherein the outer race of the first bearing assembly includes an outer surface which is wholly spaced apart from an adjacent inner axially extending surface of the rack housing by a first clearance distance and the outer race of the second bearing assembly includes an outer surface which is wholly spaced apart from an adjacent inner axially extending surface of the rack housing by a second clearance distance which in use allows the associated first and/or second bearing assembly to tilt to allow for misalignment of the steering member, and wherein the second clearance distance is different from the first clearance distance.

2. The rack drive assembly of claim 1 wherein at least one spring-like member is disposed between an outer race of at least one of the first and second bearing assemblies and an adjacent inner surface of the rack housing.

3. The rack drive assembly of claim 2 wherein a generally rigid member is disposed between the at least one spring-like member and the adjacent inner surface of the rack housing.

4. The rack drive assembly of claim 1 wherein a first spring-like member is disposed between an outer race of the first bearing assembly and an adjacent inner surface of the rack housing, and wherein a second spring-like member is disposed between an outer race of the second bearing assembly and an adjacent inner surface of the rack housing.

5. The rack drive assembly of claim 4 wherein a generally rigid first member is disposed between the first spring-like member and the adjacent inner surface of the rack housing, and wherein a generally rigid second member is disposed between the second spring-like member and the adjacent inner surface of the rack housing.

6. The rack drive assembly of claim 1 wherein the first bearing assembly includes an inner race which is configured to be carried by a first stepped portion of the outer surface of the ball nut, and wherein the second bearing assembly includes an inner race which is configured to be carried by a second stepped portion of the outer surface of the ball nut.

7. The rack drive assembly of claim 1 wherein the first and second bearing assemblies have bearing contact lines which intersect generally at or near an axis of the steering member.

8. The ball nut assembly of claim 1 wherein the ball nut is a one-piece ball nut.

9. The ball nut assembly of claim 1 wherein the first bearing assembly defines a first contact angle between 40 to 45 degrees and the second bearing assembly defines a second contact angle between 40 to 45 degrees, and wherein an axial distance between the first and second contact angles is greater than an axial distance defined between center axes of the first and second bearing assemblies.

10. A rack drive assembly adapted for use in a vehicle electric power steering assembly comprising:
a steering member disposed in a rack housing and including a rack portion operatively connected to a vehicle steering wheel and a screw portion;
a ball nut assembly operatively connected to the screw portion of the rack portion of the steering member for effecting axial movement of the steering member upon rotation of a vehicle steering wheel, the ball nut assembly including a ball nut having an outer surface; and
an electric motor operatively connected to the ball nut by a pulley assembly, the pulley assembly including a pulley configured to be carried by the outer surface of the ball nut;
wherein the ball nut is rotatably supported within the rack housing by a first bearing assembly and a second bearing assembly, the first bearing assembly disposed within the rack housing about the outer surface of the ball nut at a first end thereof adjacent a first end of the pulley and the second bearing assembly disposed within the rack housing about the outer surface of the ball nut at an opposite second end thereof adjacent a second end of the pulley,
wherein the first and second bearing assemblies each include an outer race, wherein the outer race of the first bearing assembly includes an outer surface which is wholly spaced apart from an adjacent inner axially extending surface of the rack housing by a first clearance distance and the outer race of the second bearing assembly includes an outer surface which is wholly spaced apart from an adjacent inner axially extending surface of the rack housing by a second clearance distance which in use allows the associated first and/or second bearing assembly to tilt to allow for misalignment of the steering member, and wherein the second clearance distance is different from the first clearance distance.

11. The rack drive assembly of claim 10 wherein at least one spring-like member is disposed between an outer race of at least one of the first and second bearing assemblies and an adjacent inner surface of the rack housing.

12. The rack drive assembly of claim 11 wherein a generally rigid member is disposed between the at least one spring-like member and the adjacent inner surface of the rack housing.

13. The rack drive assembly of claim 10 wherein a first spring-like member is disposed between an outer race of the first bearing assembly and an adjacent inner surface of the rack housing, and wherein a second spring-like member is disposed between an outer race of the second bearing assembly and an adjacent inner surface of the rack housing.

14. The rack drive assembly of claim 13 wherein a generally rigid first member is disposed between the first spring-like member and the adjacent inner surface of the rack housing, and wherein a generally rigid second member is disposed between the second spring-like member and the adjacent inner surface of the rack housing.

15. The rack drive assembly of claim 10 wherein the first bearing assembly includes an inner race which is configured to be carried by a first stepped portion of the outer surface of the ball nut, and wherein the second bearing assembly includes an inner race which is configured to be carried by a second stepped portion of the outer surface of the ball nut.

16. The rack drive assembly of claim 10 wherein the first and second bearing assemblies have bearing contact lines which intersect generally at or near an axis of the steering member.

17. The ball nut assembly of claim 10 wherein the ball nut is a one-piece ball nut.

18. The ball nut assembly of claim 10 wherein the first bearing assembly defines a first contact angle between 40 to 45 degrees and the second bearing assembly defines a second contact angle between 40 to 45 degrees, and wherein an axial distance between the first and second contact angles is greater than an axial distance defined between center axes of the first and second bearing assemblies.

19. A ball nut assembly adapted for use in a rack drive assembly of a vehicle electric power steering assembly, the rack drive assembly including a steering member disposed in a rack housing and having a rack portion operatively connected to a vehicle steering wheel and a screw portion, the ball nut assembly comprising:
a ball nut configured to be operatively connected to the screw portion of the rack portion of the steering member for effecting axial movement of the steering member upon rotation of a vehicle steering wheel;
a first bearing assembly disposed in the rack housing and carried by the ball nut for rotatably supporting the ball nut assembly relative to the steering member, the first bearing assembly disposed on a first end of the ball nut adjacent a first side of a pulley; and
a second bearing assembly disposed in the rack housing and carried by the ball nut for rotatably supporting the ball nut assembly relative to the steering member, the second bearing assembly disposed on an opposite second end of the ball nut adjacent a second side of the pulley,
wherein the first and second bearing assemblies each include an outer race, wherein the outer race of the first bearing assembly includes an outer surface which is wholly spaced apart from an adjacent inner axially extending surface of the rack housing by a first clearance distance and the outer race of the second bearing assembly includes an outer surface which is wholly spaced apart from an adjacent inner axially extending surface of the rack housing by a second clearance distance which in use allows the associated first and/or second bearing assembly to tilt to allow for misalignment of the steering member, and wherein the second clearance distance is different from the first clearance distance.

20. The ball nut assembly of claim 19 wherein at least one spring-like member is disposed between an outer race of at least one of the first and second bearing assemblies and an adjacent inner surface of the rack housing.

21. The ball nut assembly of claim 20 wherein a generally rigid member is disposed between the at least one spring-like member and the adjacent inner surface of the rack housing.

22. The ball nut assembly of claim 19 wherein a first spring-like member is disposed between an outer race of the first bearing assembly and an adjacent inner surface of the rack housing, and wherein a second spring-like member is disposed between an outer race of the second bearing assembly and an adjacent inner surface of the rack housing.

23. The ball nut assembly of claim 22 wherein a generally rigid first member is disposed between the first spring-like member and the adjacent inner surface of the rack housing, and wherein a generally rigid second member is disposed between the second spring-like member and the adjacent inner surface of the rack housing.

24. The ball nut assembly of claim 19 wherein the first bearing assembly includes an inner race which is configured to be carried by a first stepped portion of the outer surface of the ball nut, and wherein the second bearing assembly includes an inner race which is configured to be carried by a second stepped portion of the outer surface of the ball nut.

25. The ball nut assembly of claim 19 wherein the first and second bearing assemblies have bearing contact lines which intersect generally at or near an axis of the steering member.

26. The ball nut assembly of claim 19 wherein the ball nut is a one-piece ball nut.

27. The ball nut assembly of claim 19 wherein the first bearing assembly defines a first contact angle between 40 to 45 degrees and the second bearing assembly defines a second contact angle between 40 to 45 degrees, and wherein an axial distance between the first and second contact angles is greater than an axial distance defined between center axes of the first and second bearing assemblies.

* * * * *